(12) United States Patent
Ashihara et al.

(10) Patent No.: US 9,958,007 B2
(45) Date of Patent: May 1, 2018

(54) SLIDE BEARING

(71) Applicant: TAIHO KOGYO Co., Ltd., Toyota-shi, Aichi (JP)

(72) Inventors: Katsuhiro Ashihara, Toyota (JP); Yuichiro Kajiki, Toyota (JP); Hiroki Takata, Toyota (JP)

(73) Assignee: TAIHO KOGYO CO., LTD., Toyota-Shi, Aichi (JP)

( * ) Notice: Subject to any disclaimer, the term of this patent is extended or adjusted under 35 U.S.C. 154(b) by 0 days. days.

(21) Appl. No.: 15/112,312

(22) PCT Filed: Jan. 16, 2015

(86) PCT No.: PCT/JP2015/051105
§ 371 (c)(1),
(2) Date: Jul. 18, 2016

(87) PCT Pub. No.: WO2015/111521
PCT Pub. Date: Jul. 30, 2015

(65) Prior Publication Data
US 2016/0333930 A1    Nov. 17, 2016

(30) Foreign Application Priority Data

Jan. 22, 2014    (JP) ................. 2014-009762

(51) Int. Cl.
*F16C 33/10* (2006.01)
*F16C 9/02* (2006.01)
*F16C 17/02* (2006.01)

(52) U.S. Cl.
CPC ............ *F16C 33/1065* (2013.01); *F16C 9/02* (2013.01); *F16C 17/022* (2013.01)

(58) Field of Classification Search
CPC ........ F16C 9/02; F16C 17/022; F16C 33/046; F16C 33/1065
See application file for complete search history.

(56) References Cited

U.S. PATENT DOCUMENTS

| 3,680,932 A | 8/1972 | Raimondi |
| 2004/0062458 A1 | 4/2004 | Mian et al. |

(Continued)

FOREIGN PATENT DOCUMENTS

| DE | 1102006010698 A1 | 9/2007 |
| JP | H01154323 U | 10/1989 |

(Continued)

OTHER PUBLICATIONS

International Search Report corresponding to Application No. PCT/JP2015/051105; dated Mar. 10, 2015, with English translation.

(Continued)

*Primary Examiner* — Phillip A Johnson
(74) *Attorney, Agent, or Firm* — Cantor Colburn LLP

(57) ABSTRACT

A slide bearing, in which halved members, made by dividing a cylinder parallel to the axial direction are disposed vertically, includes a groove circumferentially provided at the axial end of a lower halved member and a recess provided on an axially outer periphery of the groove, where a circumferential length of the recess is formed to be shorter than a length of the groove. The recess is formed such that its upstream end in the axial rotation direction aligns with an upstream end in the rotation direction of the groove. The recess is formed such that its downstream end in the rotation direction is located upstream relative to the circumferential center of the groove.

3 Claims, 4 Drawing Sheets

(56) References Cited

U.S. PATENT DOCUMENTS

| | | | |
|---|---|---|---|
| 2008/0025658 A1* | 1/2008 | Hochmayr | F16C 9/02 384/457 |
| 2012/0148179 A1 | 6/2012 | Kondo et al. | |
| 2013/0064487 A1 | 3/2013 | Ishigo | |

FOREIGN PATENT DOCUMENTS

| | | |
|---|---|---|
| JP | 07001332 U | 1/1995 |
| JP | H07071458 A | 3/1995 |
| JP | 2821769 B2 | 11/1998 |
| JP | 2003532036 A | 10/2003 |
| JP | 2011027244 A | 2/2011 |
| JP | 2013057351 A | 3/2013 |
| KR | 101014567 B1 | 2/2011 |
| WO | 2011098290 A1 | 8/2011 |

OTHER PUBLICATIONS

Extended European Search Report for corresponding Application No. 15740277.7-1751/3098466 PCT/JP2015051105; dated Oct. 10, 2017.

Notification of Reasons for Refusal for corresponding JP Application No. 2014-009762; dated Apr. 11, 2017.

SIPO Second Office Action for corresponding CN Application No. 201580005377.9; dated Aug. 3, 2017.

* cited by examiner

SLIDE BEARING

CROSS REFERENCE TO RELATED APPLICATIONS

This is the U.S. national stage of application No. PCT/JP2015/051105, filed on Jan. 16, 2015. Priority under 35 U.S.C. § 119(a) and 35 U.S.C. § 365(b) is claimed from Japanese Application No. 2014-009762, filed Jan. 22, 2014, the disclosure of which is also incorporated herein by reference.

TECHNICAL FIELD

The present invention relates to a slide bearing. In detail, the present invention relates to a slide bearing having vertically disposed halved members which are made by dividing a cylinder parallel to the axial direction.

BACKGROUND ART

Conventionally, a slide bearing for holding a crankshaft of an engine has half structure in which a cylindrical member is divided in two and the two members are mated, is known. In order to reduce the frictional area of the bearing and to obtain friction-reducing effect, the width of the bearing is reduced. However, reducing the width of the bearing causes increase of amount of effluent oil. Then, it is publicly known that relief parts (grooves) all over the circumference are formed at the both ends of the bearing in the axial direction (Patent Literature 1).

PRIOR ART REFERENCE

Patent Literature

Patent Literature 1: the Japanese Translation of PCT International Application Publication No. JP 2003-532036 A

SUMMARY OF INVENTION

Problems to be Solved by the Invention

However, in the conventional bearing in which grooves all over the circumference are formed, reducing a friction area causes a decrease of the load carrying capacity and the oil film thickness which is necessary for good lubrication is not able to be kept and also the total amount of effluent oil is much.

In consideration of the above problems, the present invention provides a slide bearing which can obtain friction-reducing effect and suppress total amount of effluent oil.

Means for Solving the Problems

Problems to be solved by the present invention are described as above and the means for solving the problems is described.

According to a first aspect of the present invention, a slide bearing in which halved members made by dividing a cylinder parallel to an axial direction are disposed vertically includes a groove circumferentially provided at an axial end of a lower halved member and a recess provided on an axially outer periphery of the groove, where a circumferential length of the recess is formed to be shorter than a length of the groove.

According to a second aspect of the present invention, the recess is formed such that its upstream end in the axial rotation direction aligns with an upstream end in the axial rotation direction of the groove.

According to a third aspect of the present invention, the recess is formed such that its downstream end in the axial rotation direction is located upstream side relative to a circumferential center of the groove.

Effects of the Invention

The present invention has the following effects.

Namely, by providing the grooves which do not prevent the generation of the oil film pressure, the friction-reducing effect is obtained while the frictional area is reduced, and the total amount of effluent oil is reduced.

Providing the recess on the periphery of the groove allows adjustment for increasing an amount of sucked-back oil.

Also, providing the upstream end in the axial rotation direction of the recess at the upstream end in the axial rotation direction of the groove increases an amount of suck back at the upstream end in the axial rotation direction. The downstream end in the axial rotation direction of the recess is not provided downstream of the periphery of the groove so that the amount of leakage oil is reduced. Thus, the total amount of leakage oil is reduced.

EMBODIMENTS OF THE INVENTION

Figure 1:
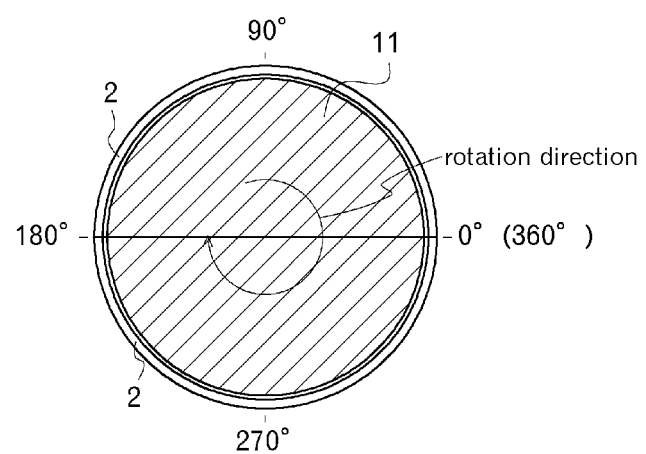
FIG. 1 is a front view illustrating a slide bearing according to an embodiment of the present invention.

An embodiment of the invention is described. FIG. 1 is the front view of a slide bearing 1 and the up and down on the drawing is defined as the up and down direction and the near and far direction on the drawing is defined as the axial direction (the front and back direction).

Firstly, halved members 2 which configure the slide bearing 1 concerning the first embodiment are described with reference to FIG. 1 and FIG. 2.

The slide bearing 1 is cylindrical member and is applied to the slide bearing structure of a crankshaft 11 of the engine as shown in FIG. 1. The slide bearing 1 is configured by the two halved members 2, 2. The halved members 2, 2 have the shapes in which the cylinder has been divided parallel to the axial direction and are shaped as semicircle shape on the cross-section view. In the embodiment, the halved members 2, 2 are disposed in the top and the bottom and the mating surfaces are shaped at the right and the left. In the case that the crankshaft 11 is held by the slide bearing 1, the clearance is formed and lubricating oil is supplied from oil route which is not shown toward the clearance.

Figure 2:
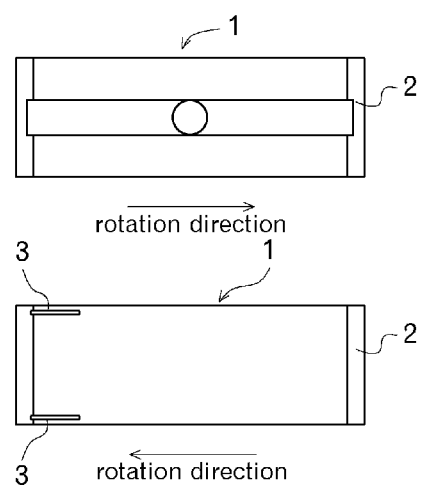
FIG. 2 is a plan view of halved members constituting the slide bearing according to the embodiment of the present invention.

In FIG. 2, the upper and lower halved members 2 are shown. In the embodiment, the rotation direction of the crankshaft 11 is clockwise direction on the front view as an arrow shown in FIG. 1. In the bearing angle co, the right edge in FIG. 1 is defined as 0 degrees and the counter clockwise direction shown in FIG. 1 is positive direction. Thus, in FIG. 1, the bearing angle co at the left edge is defined as 180 degrees and the bearing angle co at the down edge is defined as 270 degrees.

A groove is provided in the circumferential direction at the inner circumference of the upper halved member 2 and the circle hole is provided at the center. The mating surfaces are disposed at the right and left side of the upper halved member 2.

In the slide surface of the inner circumference of the lower halved member 2, grooves 3 are formed at the edge in the axial direction.

The grooves 3 are provided at the lower halved member 2. In the embodiment, the two grooves 3 are provided parallel to the axial direction. A downstream end 3a in the rotation direction of the grooves 3 is provided to be adjacent to the mating surface on the downstream side of the rotation direction of the crankshaft 11 and not to be communicated with the mating surface on the downstream side of the rotation direction.

In detail, the downstream end 3a in the rotation direction of the grooves 3 is disposed at the bearing angle $\omega 0$ which is bigger than 180 degrees where the mating surface on the downstream side of the rotation direction of the crankshaft 11 is located. Thus, the groove 3 is provided from the bearing angle co which is bigger than the angle of the mating surface on the downstream side of the rotation direction of the crank shaft 11 (the bearing angle $\omega$ is 180 degrees) toward the direction in which the bearing angle co is positive number (the counter clockwise direction) on the circumferential direction.

Thus, in the lower halved member 2, the mating surface on the right side in FIG. 1 is the mating surface on the upstream side of the rotation direction and the mating surface on the left side in FIG. 1 is the mating surface on the downstream side in the rotation direction.

The length l of the groove 3 is configured as the length from the downstream end 3a (the bearing angle is $\omega 0$) in the rotation direction to an upstream end 3b (the bearing angle is $\omega 1$) in the rotation direction. Furthermore, the bearing angle $\omega 1$ is greater than $\omega 0$ and not greater than 270 degrees. More detailed, the bearing angle $\omega 1$ usually falls within a range from 225 degrees to 270 degrees (inclusive).

Figure 4A:
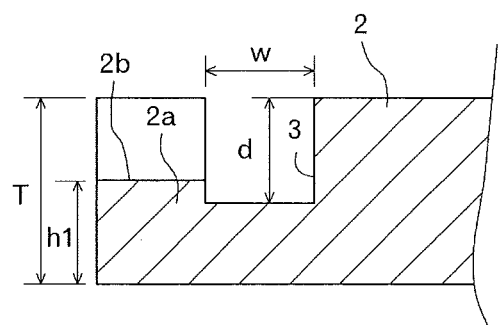
FIG. 4A is an enlarged sectional view taken along line C-C of the halved member according to the embodiment of the present invention.
Figure 4B:
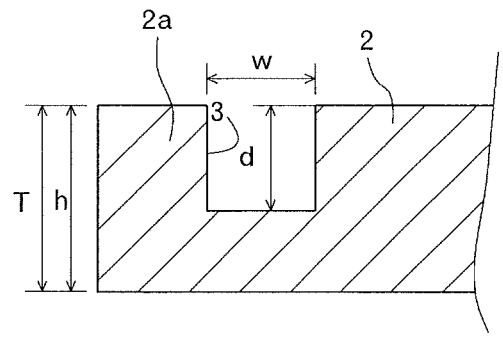
FIG. 4B is an enlarged sectional view taken along line D-D of the halved member according to the embodiment of the present invention.

As shown in FIG. 4A and FIG. 4B, the groove 3 is configured as the depth d which is shallower than the bearing thickness T. The width of the groove 3 is configured as w.

The axially outer side of the groove 3 is provided with a periphery 2a, and a height h of the periphery 2a is configured to be the same height as the bearing thickness T as shown in FIG. 4B.

The periphery 2a forming the axially outer side of the groove 3 is provided with a recess 2b.

The recess 2b is formed in about the same width as the periphery 2a in the axial direction and is formed in a bowl shape when viewed in cross-section.

Figure 3A:
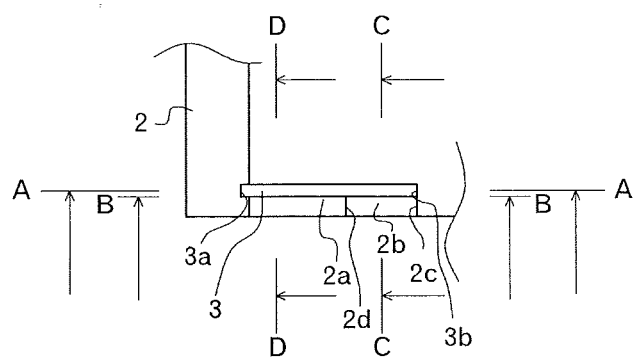
FIG. 3A is an enlarged plan view of a halved member according to the embodiment of the present invention.
Figure 3B:
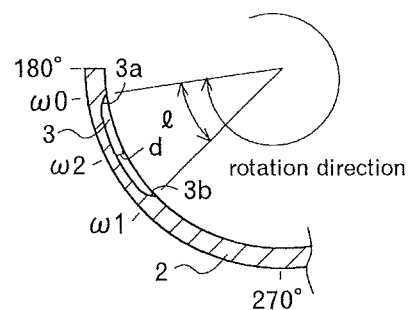
FIG. 3B is an enlarged sectional view taken along line A-A of the same.
Figure 3C:
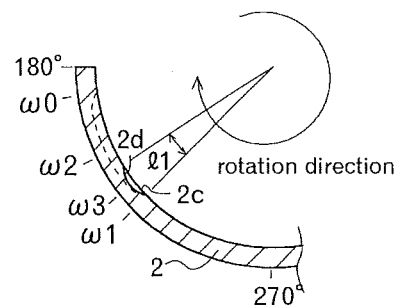
FIG. 3C is an enlarged sectional view taken along line B-B of the same.

As shown in FIGS. 3A and 3C, the recess 2b is formed such that its upstream end 2c in the rotation direction of the recess 2b circumferentially aligns with an upstream end 3b (the bearing angle is $\omega 1$) in the rotation direction of the groove 3. A downstream end 2d in the rotation direction of the recess 2b is provided upstream relative to the downstream end 3a in the rotation direction of the groove 3. Thus, a circumferential length l1 of the recess 2b is configured to be shorter than the length l of the groove 3. In more detail, the downstream end 2d in the rotation direction of the recess 2b is provided upstream relative to the circumferential center (bearing angle $\omega=\omega 2$) of the groove 3. Such a configuration can increase the amount of suck back only at the upstream end 3b in the rotation direction. That is, while the amount of suck back is not increased at the downstream end 3a in the rotation direction, an increase in the amount of leakage oil can be prevented.

The height h of the periphery 2a in part of which the recess 2b is provided is configured to be higher than the bottom surface of the groove 3. That is, a height h1 of the periphery 2a in part of which the recess 2b is provided is configured to be higher than the bottom surface of the groove 3 even at a position (bearing angle $\omega=\omega 3$) where the bottom surface of the recess 2b is lowest, as shown in FIG. 4B. In the embodiment, the position (bearing angle $\omega=\omega 3$) where the bottom surface of the recess 2b is lowest is located at the circumferential center of the recess 2b.

While the height h of the periphery 2a other than the recess 2b is formed to be constant in the embodiment, it is not limited thereto. For example, a height h of the periphery 2a other than the recess 2b can be varied circumferentially in a continuous manner.

As described above, the slide bearing 1 in which the halved members 2, 2 made by dividing a cylinder parallel to the axial direction are disposed vertically includes the groove 3 circumferentially provided at the axial end of the lower halved member 2 and the recess 2b provided on the axially outer periphery 2a of the groove 3, where the circumferential length l1 of the recess 2b is formed to be shorter than the length l of the groove 3.

Such a configuration, in which the periphery 2a is provided with the recess 2b, allows adjustment for increasing the amount of sucked-back oil by changing an oil film pressure gradient. In other words, the recess 2b is provided to create a space between the surface of the beating and the groove, thereby increasing the amount of sucked-back oil.

Additionally, the recess 2b is formed such that the upstream end 2c in the axial rotation direction aligns with the upstream end 3b in the rotation direction of the groove 3.

Such a configuration, in which the upstream end 2c in the rotation direction of the recess 2b is provided at the upstream end 3b in the axial rotation direction of the groove 3, increases the amount of suck back at the upstream end 3b in the rotation direction of the groove 3.

Further, the recess 2b is formed such that the downstream end 2d in the axial rotation direction is located upstream side relative to the circumferential center (bearing angle $\omega=\omega 2$) of the groove 3.

Such a configuration, in which the downstream end 2d in the rotation direction of the recess 2b is not provided downstream of the periphery 2a of the groove 3, reduces the amount of leakage oil at the downstream in the rotation direction of the groove 3. Thus, the total amount of leakage oil is reduced.

INDUSTRIAL APPLICABILITY

The present invention can be applied to the skill of the slide bearing and applied to the slide bearing having vertically disposed halved members which are made by dividing a cylinder parallel to the axial direction.

DESCRIPTION OF REFERENCE SIGNS

1: Slide bearing
2: Halved member(s)

2*a*: Periphery
2*b*: Recess
2*c*: Upstream end in the rotation direction
2*d*: Downstream end in the rotation direction
3: groove
3*a*: Downstream end in the rotation direction
3*b*: Upstream end in the rotation direction
11: Crankshaft

The invention claimed is:

1. A slide bearing in which halved members made by dividing a cylinder parallel to an axial direction are disposed vertically, the slide bearing comprising:
 grooves provided at both axial ends on a downstream side in an axial rotation direction of a lower halved member; and
 a recess provided on an axially outer periphery of each of the grooves,
 wherein a bottom surface of the recess is formed to be higher than a bottom surface of the groove, and
 a circumferential length of the recess is formed to be shorter than a length of the groove.

2. The slide bearing according to claim 1, wherein the recess is formed such that an upstream end of the recess in an axial rotation direction aligns with an upstream end in the rotation direction of the groove.

3. The slide bearing according to claim 2, wherein the recess is formed such that a downstream end of the recess in the axial rotation direction is located upstream side relative to a circumferential center of the groove.

* * * * *